UNITED STATES PATENT OFFICE.

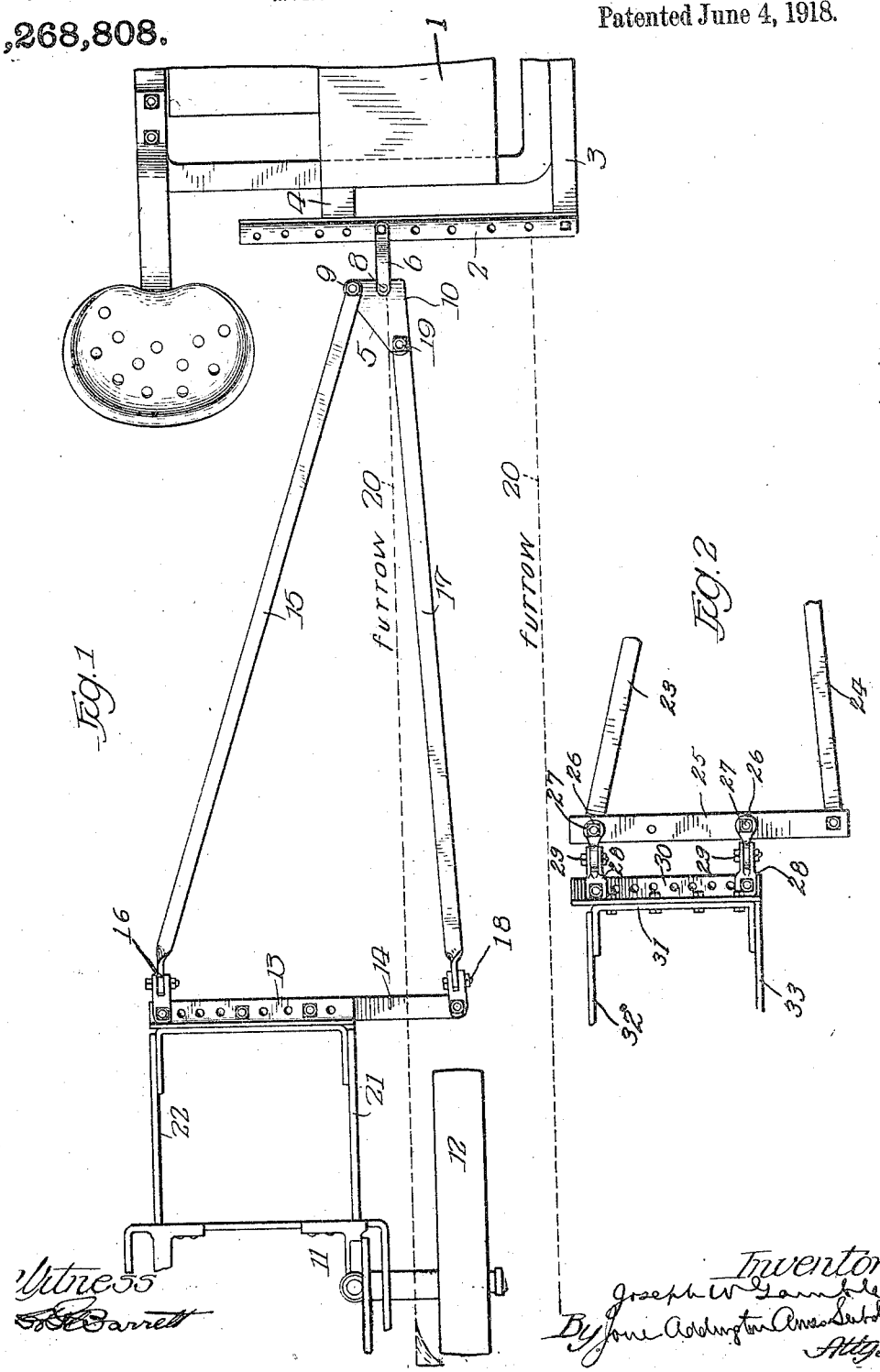

JOSEPH W. GAMBLE, OF CARPENTERSVILLE, ILLINOIS.

BALANCE-PLATE OR OSCILLATING MEMBER.

1,268,808.  Specification of Letters Patent.  Patented June 4, 1918.

Application filed September 2, 1915. Serial No. 48,739.

*To all whom it may concern:*

Be it known that I, JOSEPH W. GAMBLE, a citizen of the United States, residing at Carpentersville, in the county of Kane and State of Illinois, have invented new and useful Improvements in Balance-Plates or Oscillating Members, of which the following is a full, clear, concise, and exact description, reference being had to the accompanying drawing, forming a part of this specification.

My invention relates to improvements in draft devices and has for its object the production of a device used in connection with tractors and plows in such a manner as to substantially eliminate side draft.

A further object is the production of a device by the use of which the plow will remain in line while traveling over the ground in raised position.

A further object of my device is the production of a device of simple construction, cheaply manufactured, and not liable to breakage or disarrangement of parts.

These and such other objects as may hereinafter appear are attained by my device, an embodiment of which is illustrated in the accompanying drawing, in which Figure 1 represents a plan view of fragmentary portions of a tractor and plow with my device in operative position therebetween. Fig. 2 represents a plan view of a modified form of connection between the plow frame and draw bars.

Referring now to the drawing.

1 represents the rear of an ordinary bull tractor having a clevis 2 mounted on the frame in any suitable manner, as for instance by being bolted to rearwardly extending bars 3 and 4. An oscillating member 5 is connected to the tractor clevis by means of a link 6, one end of which is bolted to the clevis and the other end to the member 5, at 8, the point of attachment being intermediate the upper land side corner 9 and the furrow side of the plate.

The gang plow 11, the wheel 12 of which travels in the furrow, is provided with the usual plow clevis 13 and an extension bar 14, extending in the same direction as the clevis and continuing it substantially in front of the plow the width and beyond the line of draft of the tractor over the edge of the line of the first furrow.

The land side draw bar 15 is bolted to the outer end of the plow clevis at 16 and to the member 5 at 9. A furrow side draw bar 17 is pivotally connected to the extreme end of the extension bar 14 at 18 and at its forward end to the lower furrow side corner of the balance plate at 19.

The line of the furrows for a two bottom gang plow are indicated by lines 20 and marked "furrow." It will be seen that by this arrangement the heavier draft is thrown on the furrow beam 21 of the plow and the lighter draft on the land side beam 22. This is accomplished by the use of the member 5, the furrow side connection being substantially in the line of direct draft, and by this device and arrangement the plow is kept from swinging to the left or into the land.

When the plow is passing over rough ground, the side vibration will be substantially eliminated and in the event of the plow point striking an obstruction the balance plate will play sidewise and the tendency of the end of the beam to be thrown toward the land will be overcome; the furrow draw bar being attached to the plate on the furrow side will bring the plate back into proper position as soon as the obstruction is passed.

A further advantage to be gained from the use of my device is that when the plow is raised it will remain in line while traveling over the ground and thus be in position to drop into operative position to do effective work at the proper time. This is a very important feature as it permits more even and regular plowing and avoids all necessity for continually readjusting the position of the plow each time after it has been raised from the ground.

I realize that my device is apparently a simple one, but the long and hard usage to which I have put it has fully demonstrated its effectiveness and usefulness.

While I have shown a triangular oscillating member, it is evident that I am not confined to that form or shape so long as the points of attachment of the draw bars and link are maintained in the proper relative position to permit the effective working of the device.

In Fig. 2 I have shown a modification in which the draw bars 23 and 24, which are connected to the oscillating member 5, are connected to a cross bar 25, which in turn is connected to a pair of links 26 by means of bolts 27. These links 26 are connected by means of bolts 29 to the clevis 30, which is secured to the plow frame 31 in such manner that the links 26 are substantially in alinement with the beams 32 and 33 of the plow frame.

Having thus described my invention, what I claim as new and desire to secure by Letters Patent is:

1. The combination with a tractor, a plow a plow clevis, an extension on the furrow said of said clevis, a triangularly-shaped oscillating member pivotally connected on its shortest side and at a point intermediate thereof to said tractor, a furrow side draw bar connected at its forward end to the furrow side of said oscillating member and at its rear end to the clevis extension, a land side draw bar pivotally connected at its forward end to the land side of said oscillating member and at its rear end to the land side end of the plow clevis, and means for laterally adjusting the connection between the land-side draw bar and the plow clevis.

2. The combination with a tractor of a triangularly-shaped oscillating member connected on its shortest side and at a point intermediate thereof to said tractor, a plow, a plow connection having an extension toward the furrow side, a furrow-side draft bar connected at its forward end to the rearward corner of said triangular oscillating member and at its rear end to the furrow-side extension of the plow connection, said oscillating member being adapted to lie with one of its sides substantially in line with the furrow-side draft bar, a land-side draft bar pivotally connected at its forward end to the land-side corner of said triangular oscillating member and at its rear end to the land-side end of the plow connection.

In witness whereof, I have hereunto subscribed my name.

JOSEPH W. GAMBLE.